Jan. 27, 1942. H. PERSSON 2,271,489
COMBINATION CUTTING AND BREAKING MACHINE
Filed May 13, 1941
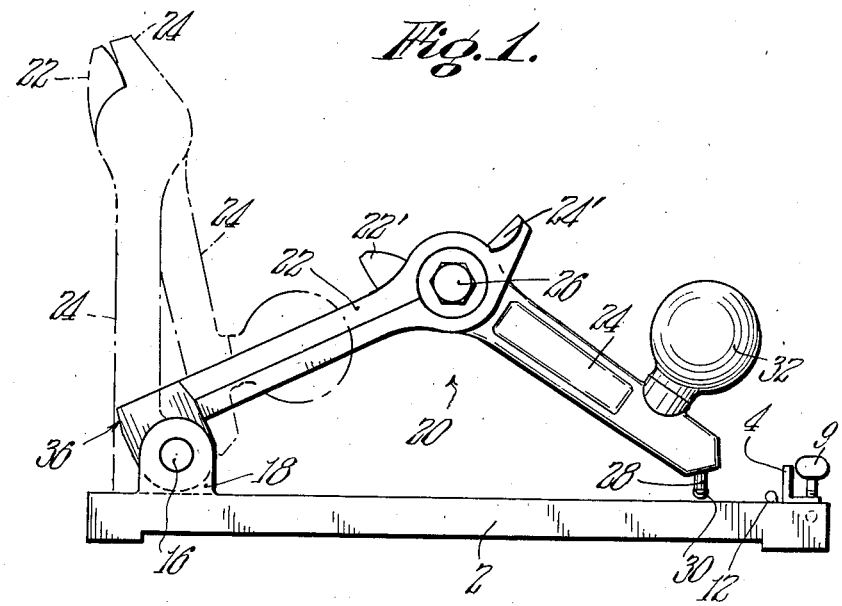
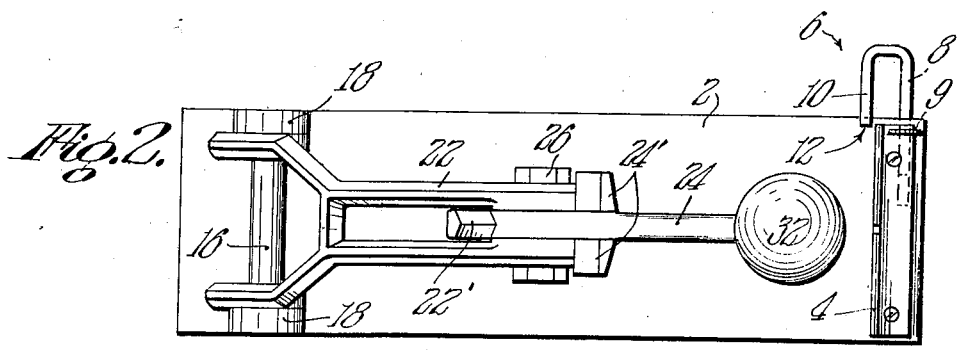
INVENTOR.
Henry Persson.
BY Walter C. Ross, Attorney.

Patented Jan. 27, 1942

2,271,489

UNITED STATES PATENT OFFICE 2,271,489

COMBINATION CUTTING AND BREAKING MACHINE

Henry Persson, Newark, N. J., assignor to Landon P. Smith, Inc., Irvington, N. J., a corporation of New Jersey Application May 13, 1941, Serial No. 393,215

3 Claims. (Cl. 125—23)

This invention relates to improvements in apparatus for cutting, scoring and/or breaking tile and the like.

The principal objects of the invention are the provision of a machine for cutting, scoring and/or breaking tile and the like which is efficient in its operation, relatively simple in construction so as to be economical to manufacture and which is sufficiently flexible for the many and various purposes for which it is adapted.

Various and novel objects and advantages of the invention will be hereinafter more fully referred to in connection with the accompanying drawing wherein:

Fig. 1 is a side elevational view of an apparatus embodying the novel features of the invention; and Fig. 2 is a side elevational view of the apparatus shown in Fig. 1.

Referring now to the drawing more in detail, the invention will be fully described.

A base or support is represented at 2 which has on one end a guide 4 secured thereto. The material to be cut or scored is placed upon the support up against said guide to position the same and hold it against movement in one direction.

The material to be cut or scored may be tile, glass, or any material requiring scoring, cutting, marking or indenting and for purposes of disclosure will be referred to as object.

A guide 6 has a main body part 8 slidable in the support 2 and a parallel offset portion 10 the end of which may be disposed in various positions to locate the object transversely of the support all as may be desired. A set screw 9 is provided which is in threaded engagement with the base to engage and hold the guide 6 in various positions of adjustment.

A transverse rod 16 is carried by lugs 18 associated with opposite sides of the support 2 and on this is swingable a combination cutter carrier and breaking device indicated generally by 20.

The carrier 20 is composed of an inner or rear part 22 pivoted to the rod 16 as described and an outer or forward part 24 pivoted thereto at 26. A member 28 in the forward end of part 24 carries a cutting or scoring element which in the form of the invention disclosed may be a cutter wheel 30.

A manually engageable handle 32 is provided on the part 24, as shown, which may be grasped for manipulating the members 22 and 24.

When an object is placed on the support with one side against the guide 4 and an adjacent side against the end 12 of guide 6 the handle 32 may be grasped by the hand to move the members 22 and 24 so that element 30 may traverse the object.

The pivoted together parts of the carrier which is swingable on the rod makes it possible to traverse an object of any length or width that may be accommodated by the support since it is possible to move the cutting or scoring element at any height above the support.

The pivoted end of the part 22 is arranged to provide a considerable spread on the pivot rod 16 and is held against the lugs 18 without objectionable end play so that the carrier may be operated to move the element in a straight line on or across the object.

The members 22 and 24 at their pivoted inner ends carry co-operating more or less radially disposed jaws 22' and 24'.

These are arranged to receive therebetween the object which has been scored or cut and are adapted to exert sufficient pressure to cause the object to be severed or broken on the scoring or cutting line.

The member 22 is provided with a stop 36 which when the said member 22 is swung to the dot-dash line position of Fig. 1 abuts the support 2 so that said member 22 is held against counterclockwise movements.

In this position the object to be severed or broken is placed between the jaws 22' and 24' and the member 24 may be swung or manipulated in such a way that the jaws engage and exert the desired pressure to the object.

Thus the carrier is readily manipulated to cause the scoring or cutting element to traverse the object and may be utilized for breaking or severing the object which has been scored or cut.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A machine of the class described comprising in combination, a support for an object, a carrier including an inner member having its inner end portion pivoted to said support adjacent a side thereof for swinging movements in clockwise and counterclockwise directions relative thereto, an outer member having its inner end portion pivoted to the outer end portion of said inner member for swinging movements relative thereto in substantially the same vertical plane therewith, a cutting element on the outer end of said outer member, and cooperating jaws on said outer end portion of the inner member and said inner end portion of the outer member.

2. A machine of the class described comprising in combination, a support for an object, a carrier including an inner member having its inner end portion pivoted to said support adjacent a side thereof providing an outer free end for swinging movements in clockwise and counterclockwise directions relative thereto and an outer member having its inner end portion pivoted to the outer free end of said inner member for swinging movements in clockwise and counterclockwise directions and in substantially the same vertical plane therewith, a cutting tool on the outer end of said outer member adapted to traverse an object on said support as the outer end of the outer member is swung on the inner member and said inner member is swung relative to said support, and co-operating jaws on outer and inner end portions of the inner and outer members respectively adapted to act on an object therebetween when the free end of the outer member is swung towards the inner end of the inner member.

3. A machine of the class described comprising in combination, a support for an object, a carrier including an inner member having its inner end portion pivoted to said support adjacent a side thereof providing an outer free end for swinging movements in clockwise and counterclockwise directions relative thereto and an outer member having its inner end portion pivoted to the outer free end of said inner member for swinging movements in clockwise and counterclockwise directions and in substantially the same vertical plane therewith, a cutting tool on the outer end of said outer member adapted to traverse an object on said support as the outer end of the outer member is swung on the inner member and said inner member is swung relative to said support, a stop adjacent the inner end of the inner end of the inner member for abutting the support to limit and hold said member against counterclockwise swinging movements from a substantially vertical position relative to the support, and co-operating jaws on the outer and inner end portions of the inner and outer members respectively adapted to act on an object therebetween when the free end of the outer member is swung clockwise towards the inner end of the inner member.

HENRY PERSSON.